(12) United States Patent
Porter et al.

(10) Patent No.: US 6,357,473 B1
(45) Date of Patent: Mar. 19, 2002

(54) ONE WAY ANTI-BACKFLOW VALVE

(75) Inventors: Stephen P. Porter, Almont; Andrew L. Patrius, Jr., Attica, both of MI (US)

(73) Assignee: Ligon Brother Manufacturing Company, Almont, MI (US)

( * ) Notice: Subject to any disclaimer, the term of this patent is extended or adjusted under 35 U.S.C. 154(b) by 0 days.

(21) Appl. No.: 09/578,773

(22) Filed: May 25, 2000

Related U.S. Application Data

(60) Provisional application No. 60/136,469, filed on May 28, 1999.

(51) Int. Cl.$^7$ ............................. F16K 15/16; B60H 1/24
(52) U.S. Cl. .................................. 137/512.15; 137/855
(58) Field of Search .................... 137/512.1, 512.15, 137/852, 854, 855

(56) References Cited

U.S. PATENT DOCUMENTS

| | | |
|---|---|---|
| 83,549 A | 10/1868 | Reynolds |
| 249,557 A | 11/1881 | Truesdell |
| 1,306,391 A | 6/1919 | Romanoff |
| 3,191,618 A | 6/1965 | McKim |
| 3,274,915 A | 9/1966 | Ziegenfelder |
| 3,286,617 A | 11/1966 | Shirk |
| 3,391,628 A * | 7/1968 | Ziegenfelder ............... 454/164 |
| 4,838,262 A | 6/1989 | Katz |
| 4,934,362 A * | 6/1990 | Braun ......................... 137/855 |
| 4,972,765 A | 11/1990 | Dixon |
| 5,194,038 A | 3/1993 | Klomhaus et al. |
| 5,492,505 A | 2/1996 | Bell et al. |
| 5,687,767 A | 11/1997 | Bowers ....................... 137/855 |
| 5,695,397 A | 12/1997 | Frank et al. |
| 5,727,999 A | 3/1998 | Lewis |
| 5,779,536 A | 7/1998 | McCorkel et al. |
| 5,803,122 A | 9/1998 | Theilmeier |
| 5,904,618 A | 5/1999 | Lewis |
| 6,026,852 A | 2/2000 | Barton et al. |

* cited by examiner

*Primary Examiner*—Michael Powell Buiz
*Assistant Examiner*—Ramesh Krishnamurthy
(74) *Attorney, Agent, or Firm*—Dykema Gossett PLLC

(57) ABSTRACT

A one-way valve includes a plate and a flexible vane. The plate has a vent opening of a first size and shape. The plate has a first curvature. The flexible vane has a second curvature distinct from the first curvature. The vane is fixed to the plate in a manner facilitating the deflection of the vane between an open position and a closed position. The vane is in a bent condition in the closed position. The vane conforms to the first curvature of the plate over the vent opening, and covers the vent opening in the closed position. The vane is elastic throughout a range of deflection associated with the vane moving between the closed position and the open position.

22 Claims, 5 Drawing Sheets

ONE WAY ANTI-BACKFLOW VALVE

This application claims the benefit of U.S. Provisional Application No. 60/136,469 filed May 28, 1999.

FIELD OF THE INVENTION

The invention is directed to one-way anti-back flow valves, and more particularly to anti-backflow valves suited for use as passenger vehicle cabin exhaust valves.

BACKGROUND OF THE INVENTION

One-way or anti-back flow valves are used in many different applications and have many different forms. One such application is as a valve for preventing the back flow of air, into passenger vehicle cabins. The valve both seals the cabin against the entry of poisonous fumes and the like, and vents the cabin to prevent or relieve an undesired increase of pressure therein. Such pressure increases can be caused by the operation of the heating, ventilating and air conditioning system, or by the slamming of a door of a vehicle when all of the windows are rolled up. Valves designed to serve as cabin air exhausters must both seal against back pressure, permitting very little air to leak into the cabin, and must open at very low cabin pressure to prevent or quickly reduce any significant increase in cabin pressure. Standards for acceptable flow rates are established by automotive companies.

Cabin air exhausters are typically spring or gravity operated flapper valves, with the flapper being formed of a relative soft rubber or rubber-like material. The flappers are hinged along a top edge in some manner, and hang vertically responsive to gravity. Back pressure tends to force the flappers against the supporting plate. Elevated cabin pressure pushes the flapper away from the plate, allowing cabin air to escape. One problem with such valves is that the desired level of sealing is difficult to consistently achieve. A limitation of valves relying exclusively on gravity to close is that gravity biased valves are sensitive to orientation. The valves must typically be oriented in an upright position on a vertical surface to operate. Another concern is that the flapper may flutter, creating undesired noise when open when air is passing through at a high rate of flow. If a spring is used to provide a more positive closing of the flapper than is possible with gravity, the cabin pressure needed to initiate exhausting will be undesirably increased.

It is desired to provide a one way valve which seals effectively against back flow from a first side while opening at relatively low positive pressures on the second side independent of orientation.

SUMMARY OF THE INVENTION

A one-way valve includes a plate and a flexible vane. The plate has a vent opening of a first size and shape. The plate has a first curvature. The flexible vane has a second curvature distinct from the first curvature. The vane is fixed to the plate in a manner facilitating the deflection of the vane between an open position and a closed position. The vane is in a bent condition in the closed position. The vane conforms to the first curvature of the plate over the vent opening, and covers the vent opening in the closed position. The vane is elastic throughout a range of deflection associated with the vane moving between the closed position and the open position.

A one-way valve includes a plate and a flexible vane. The plate has a vent opening of a first size and shape. The plate has a first curvature. The flexible vane has a second curvature distinct from the first curvature. The vane is fixed to the plate by a tab extending from a side of the vane. The vane is in a bent condition in a closed position. The vane covers the vent opening in the closed position. The vane conforms to the first curvature of the plate over the vent opening and covers the vent opening in the closed position. The vane is elastic throughout a range of deflection between the closed position and an open position. The tab is formed integral and unitary with the vane wherein the tab is a living hinge about which the vane pivots between the open position and the closed position.

A one-way valve includes a concave plate, a flexible vane, and a means for attaching. The concave plate has a vent opening of a first size and shape. The flexible vane has a substantially flat shape in a free state. The vane covers the opening. The vane is sufficiently flexible that it conforms to a curvature of the plate in a closed position. The vane is elastic throughout a range of deflection between the closed position and the open position. The vane is sufficiently stiff to develop a desired sealing load when forced to conform to the concave plate. The means for attaching is for attaching the flexible vane to the concave plate and enables the desired deflection of the vane between the open position and the closed position.

A one-way valve is provided which seals effectively against back flow from a first side while opening at relatively low positive pressures on the second side independent of orientation.

DETAILED DESCRIPTION OF PREFERRED EMBODIMENTS

Figure 1:
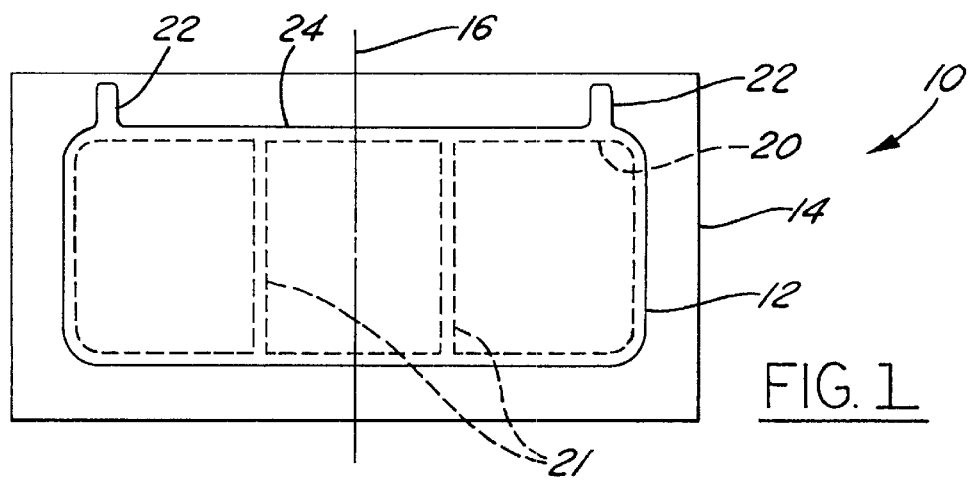
FIG. 1 is a plan view of a first embodiment of a one-way anti-backflow valve in the closed condition.
Figure 2:
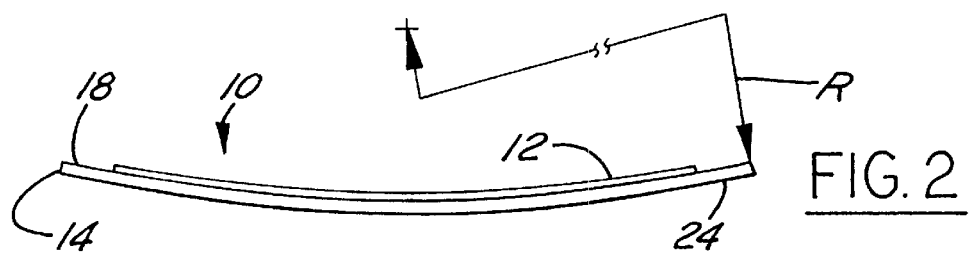
FIG. 2 is an elevational view of the valve of FIG. 1.
Figure 3:
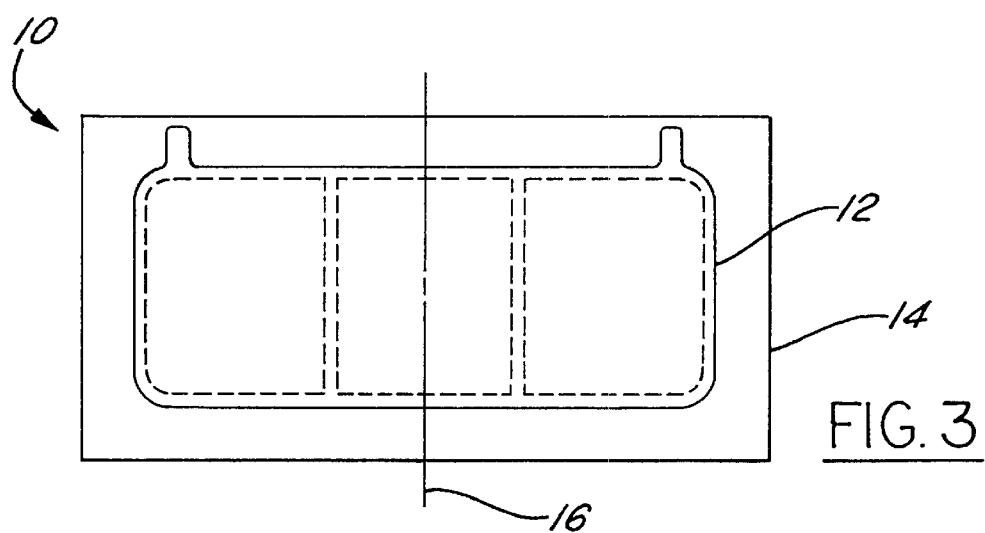
FIG. 3 is a plan view of the valve of FIG. 1 in a low pressure exhaust mode.

FIG. 1–5 shows a first embodiment of an inventive valve 10. Valve 10 can be used variously as a cabin exhaust valve, a pressure relief valve, an all purpose air exhauster valve, a check valve, an anti-backflow valve, a vane valve or flapper valve.

Vane or flapper 12 is mounted to a plate 14. Plate 14 is rigid and can be formed out of any appropriate material, including steel or plastic. Vane 12 is cut from a thin sheet of material to enhance the vane's flexibility, or ability to bend. Vane 12 must be made of material sufficiently elastic so that when bent or deflected to the degree anticipated, vane 12 returns to its previous undeflected condition. Vane 12 must be formed of material that also has a sufficiently high modulus of elasticity or stiffness to generate the desired sealing loads when it is bent or bowed. Mylar® polyester film of 0.003 to 0.005 inches (0.08 to 0.13 mm) thick has been successfully employed in testing. Polycarbonate film is an alternative material for the vane. It is preferred that the film have a coefficient of thermal expansion the same or nearly the same as the material chosen for the plate. If plate 14 is formed of talc-filled polypropylene, then polycarbonate film is best suited for the vane material. If the plate is steel, polyester film is the preferred vane material because its coefficient of thermal expansion is relatively close to that of steel. For many applications, it is preferred that plate 14 be formed of a material which is paintable. It is possible to employ plate and vane materials with mismatched coefficients of thermal expansion, so long as vane 12 is connected with plate 14 by a means that accommodates the relative expansion and contraction.

It is also preferable that the vane material be temperature stabilized so that it does not distort with temperature changes. Temperature stabilization is particularly important for valves that are going to be used in applications exposing the valves to a wide range of temperatures.

Valve plate 14 is curved about an axis of curvature 16 which extends parallel to plate 14 and about which plate 14 is curved. Vane 12 is fixed to a vane side 18 of plate 14 which is the same side on which axis 16 is disposed. Valve plate 14 has a valve opening 20 passing therethrough. Vane 12 is shaped to cover valve opening 20. Valve opening 20 may be divided by one or more support ribs 21. Ribs 21 help support vane 12 when valve 10 is subjected to back pressure, preventing vane 12 from being pushed through opening 20. The need for, the number of and the size of ribs 21 varies with the size of opening 20 and the stiffness of vane 12.

Vane 12 has two vane mounting tabs 22 formed from the same sheet of material as vane 12 which are fixed or bonded to valve plate 14. Samples tested to date have had tabs 22 adhesively bonded to the plate, but other means of retention, such as rivets, screws, or clips could be used. Tabs 22 could be heat staked to plate 14. Yet alternatively, tabs 22 could be held against plate 14 by a bracket fixed to plate 14. The precise means of fixing vane 12 to plate 14 is not critical to the operation of valve 10. What is important to the operation of valve 10 is that tabs 22 be configured to provide adequate retention of vane 12 to plate 14, and to provide an adequate restoring force biasing vane 12 to a closed condition, and to enable the desired mode of deflection of vane 12 in a high pressure or full open condition illustrated in FIGS. 5 and 6. In the embodiment of FIGS. 1–6, tabs 22 function as living hinges, allowing pivoting of vane 12 to the full open position responsive to an application of high pressure and providing a restoring force tending to return vane 12 to a closed position. Tabs have radii on each side of the base of tabs 22. The radii help prevent cracks from developing between tabs 22 and the rest of vane 12 after repeated cycling of vane 12 between the open and closed positions.

The size and shape of valve vane 12 and opening 20, the tab configuration, including the number and location of tabs 22, the stiffness of the vane material and a size of radius R of curvature of plate 14 all contribute to the sealing force of opposing a back pressure force directed against a back side 24 of plate 14. However, it is the concave curvature of the valve plate which is of particular benefit. If the valve plate was not curved, the vane would only cover opening 20, but would not be pressed against it. Tabs 14 would resist movement of vane 12, but would not provide any sealing force against plate 14. The sealing force attributably to the curvature of plate 14 is very important to the effectiveness of valve 10 in blocking the backflow of fluids. With plate 14 being curved, vane 12 is pressed against bowed plate 14 and induces sealing forces between vane 12 and plate 14. The spring force of vane 12 attributable to the bending strength of the vane about the axis of curvature 16 acts against the curved plate 14, inducing the sealing force of vane 12 against plate 14. Vane 12 is just slightly larger than the opening 12 in the plate, with sealing occurring between the outer periphery of vane 12 and the portion of the plate 14 overlapped by vane 12. The small overlap results in greater sealing pressure between vane 12 and plate 14 than if a large overlap is employed.

Testing has been conducted with plate 14 having radius R of 9 inches (230 mm). While FIG. 1 shows plate 14 having a single constant radius, that characteristic is not critical to the invention. Plate 14 must be generally concave on vane side 18 for valve 10 to function as intended. However, plate 14 may employ a curvature of multiple radii, or may even include flat portions. Valve 10 may operate adequately with a portion of the curvature being reversed or convex, however such reverse curvature must be sized and oriented so as not to prevent sealing. While such variations may not be optimal, they will still be functional.

The shape and location of tab 22 is important to maintaining vane 12 against plate 14 in the closed condition. Tab 22 must be stiff enough to keep vane 12 pressed against plate 14. The desired stiffness of tabs 22 may be achieved by forming tab 22 of sufficient width. Alternatively, the stiffness of tabs 22 could be increased by laminating a layer of materials to tabs 22 to increase their thickness. The necessary stiffness of tabs 22 will be a function of the stiffness or resistance to bowing of vane 12, and of the radius of curvature of plate 14. A smaller radius of curvature will require a stiffer tab to keep vane 12 pressed against the plate 14. If there are two tabs 22, with each located near the ends of vane 22, then the tabs 21 resistance to twisting as well as their resistance to bending may also be important. If tabs 22 can twist excessively, vane 12 may not be properly seated at the center in an unloaded condition.

If the curvature of vane 22 is reversed on opening, a near stable open position can be obtained, and very little force is required to maintain the open condition. It is possible to build a bi-stable valve, which remains open or closed until some force applied to the valve moves the vane to the opposite position. However, care must be taken to ensure that a bi-stable structure is not created unintentionally, lest vane 12 unintentionally become stuck in the open position.

The location of tabs 22 may influence the shape of vane 12. With tabs 22 located at the ends of vane 12, as shown in the FIGS. 1–6, vane 12 can have a straight edge on a side 26 with the tabs. However, for a valve having a single tab 122 at the center of vane 112 as shown in FIGS. 7–12, it is preferable to have a curved edge on the side 126 with the tabs. The radius of the curved edge is approximately that of the curvature of plate 114 to prevent interference between the ends or corners 128 of vane 112 and the curved plate 114 when vane 114 is deflected to the fully open position. However, in some applications, it may be desirable to have the interference that would result from having the side of the vane with the tabs extend in a straight line. The resulting engagement of the corners with the plate in the open condition would provide an increased restoring force biasing the vane back toward the closed position. It should also be appreciated that single tab configurations will be less sensitive to mismatches in the coefficient of thermal expansion between vane 12 and plate 14.

Figure 16:
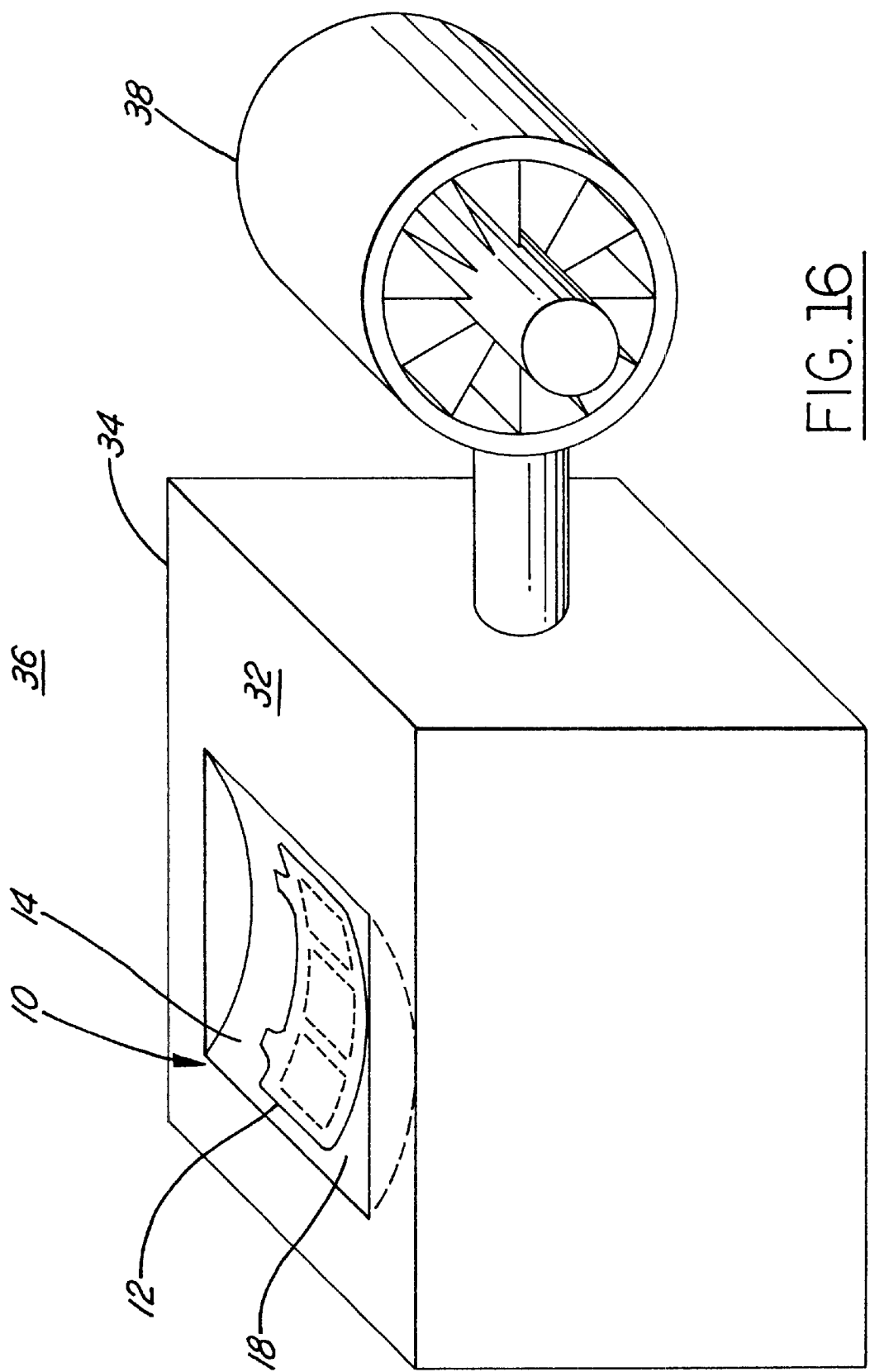
FIG. 16 is a schematic diagram of a system employing the inventive valve.

The invention operates in the following manner. Valve 10 is mounted as shown schematically in FIG. 16 to or formed in a surface 32 separating a first chamber 34 from a second region 36. It is desired to permit fluid to flow out of first chamber 34, to second region 36, and to block flow from second region 36 into first chamber 34. A source of fluid flowing from chamber 34 through valve 10 is a fan or pump 38. Fan 38 forces air into chamber 34 which exhausts through valve 10. One exemplary chamber is an automobile passenger cabin, with the outside environment constituting the second region. The fan of the heating, ventilating and air conditioning (HVAC) system corresponds to fan 38. Operation of the fan, in most operating modes of the HVAC system, forces air into the cabin which causes air in the cabin to be exhausted through valve 10. Another chamber and region combination is a furnace flue and the outside environment. Many other such applications are readily apparent. The vane side 18 of plate 14 is exposed to the environment, and the back side 24 of plate 14 is disposed toward the chamber.

When the pressures inside and outside the chamber are in equilibrium, vane 12 is held against plate 14 by the bending force of tabs 22. Both vane 12 and plate 14 preferably have a smooth finish to facilitate sealing therebetween. With pressure outside the chamber exceeding that inside the chamber, the fluid acts against vane 12, pressing it even more firmly against plate 14 than just the force of the tabs 22 alone.

Figure 4:
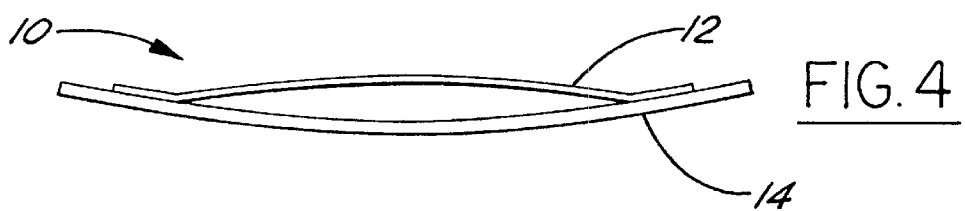
FIG. 4 is an elevational view of the valve of FIG. 3.
Figure 5:
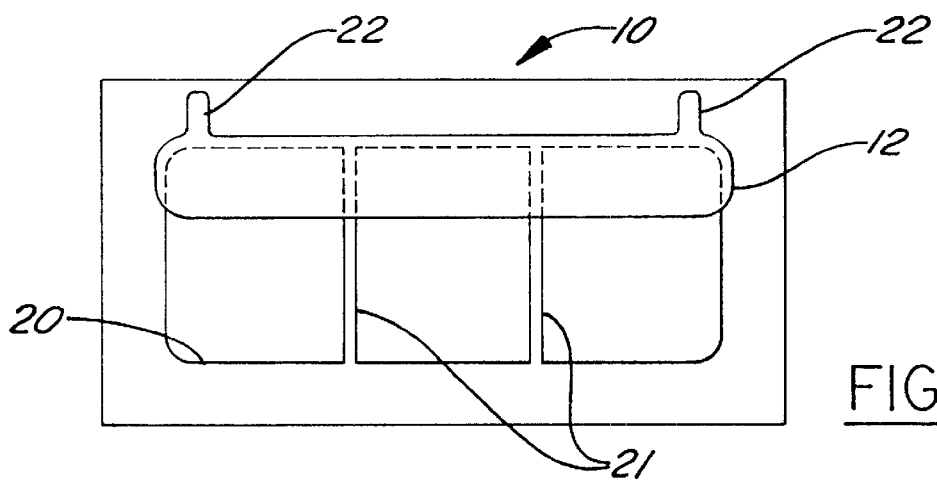
FIG. 5 is a plan view of the valve of FIG. 1 in a high pressure exhaust mode.
Figure 6:
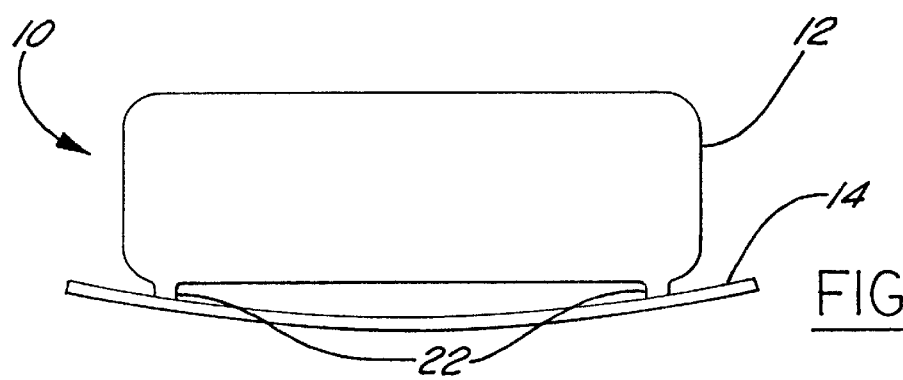
FIG. 6 is an elevational view of the valve of FIG. 5.

Shifting the pressure balance so that the pressure inside the chamber is greater than outside causes the fluid to unseat vane 12. The fluid flows out of the chamber through valve 10, past vane 12. With the pressure in the chamber greater than the pressure outside by only a small amount, vane 12 deflects in the low pressure mode illustrated in FIGS. 3 and 4. With tabs 22 still resisting deflection, vane 12 deflects at the location furthest from tabs 22 which is the center of vane 12. Vane 12 curves away from plate 14. Fluid flows from the chamber, through the now open gaps between the sides of vane 12 and plate 14, as shown in FIG. 4, into the second region. When the pressure inside the chamber is increased to a predetermined level, the resistance of tabs 22 is overcome, and vane 22 swings open about a hinge axis or axes defined by tabs 22 as shown in FIGS. 5 and 6. The hinge axis or axes are normal to axis of curvature 16. Although not shown in FIGS. 5 or 6, vane 12 would likely retain its reverse bow shape when fully unseated from plate 14 because tabs 22 are too close to each other to allow vane 12 to assume a flat shape. When the pressure inside the chamber drops, the force induced by tabs 22 pivots vane 12 back into contact and conformance with plate 14.

Figure 7:
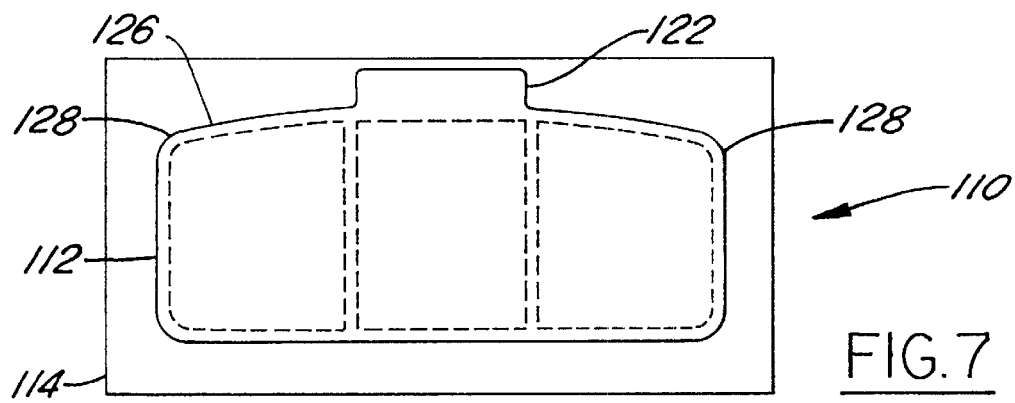
FIG. 7 is a plan view of a second embodiment of a one-way anti-backflow valve in a closed condition.
Figure 8:
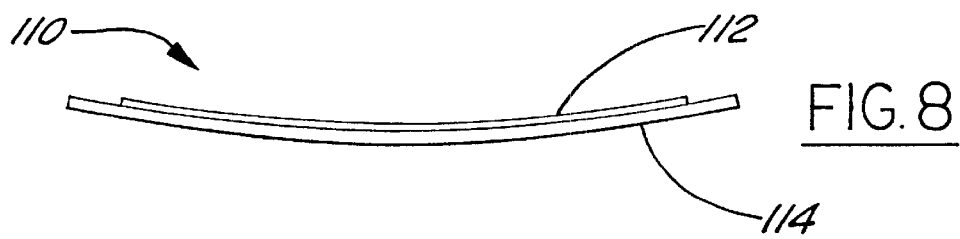
FIG. 8 is an elevational view of the valve of FIG. 7.
Figure 9:
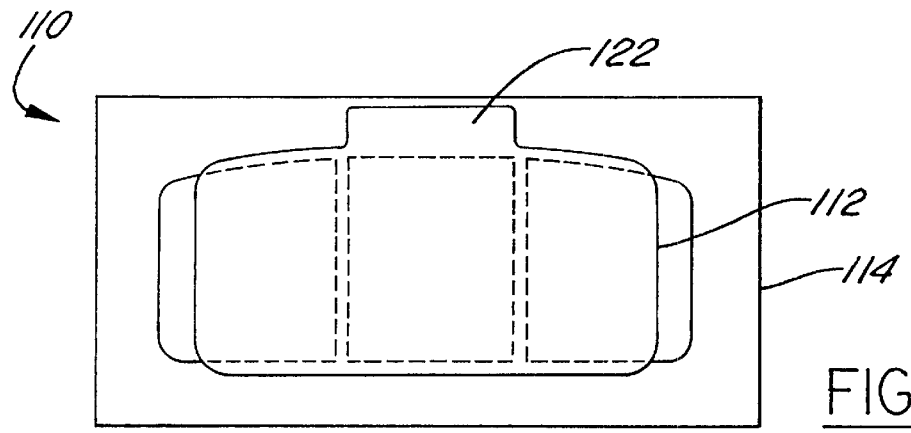
FIG. 9 is a plan view of the valve of FIG. 7 in a low-pressure exhaust mode.
Figure 10:
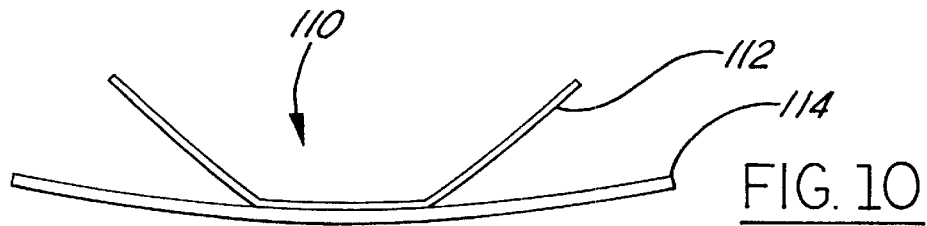
FIG. 10 is an elevational view of a valve of FIG. 9.
Figure 11:
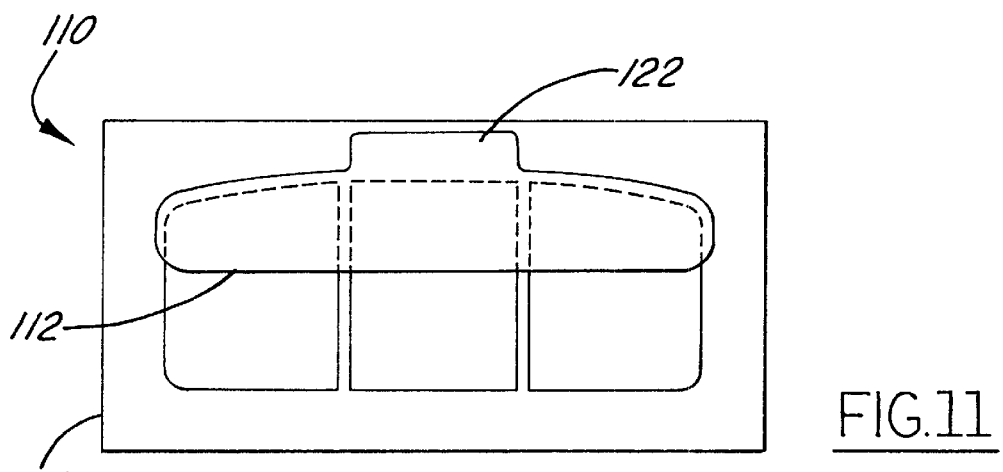
FIG. 11 is a plan view of the valve of FIG. 7 in a high-pressure exhaust mode.
Figure 12:
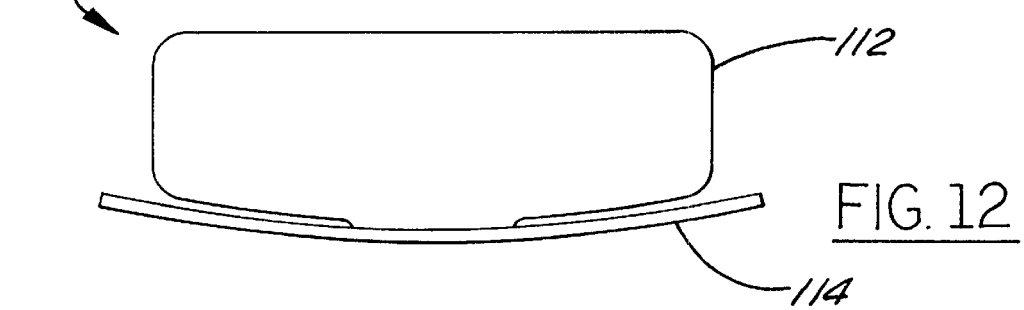
FIG. 12 is an elevational view of the valve of FIG. 11.

The embodiment of valve 110 shown in FIGS. 7 through 12 operates in a substantially identical manner to that of the embodiment of FIGS. 1–6. FIGS. 7 and 8 show vane 112 in a closed position against plate 114. FIGS. 9 and 10 show vane 112 deflected in a low pressure mode, with the ends of vane 112, now the parts most distal to tab 122, bowing away from plate 114. In the high pressure mode, vane 112 would assume a more nearly flat shape than vane 12, as the ends of vane 112 are free to extend outward.

Figure 13:
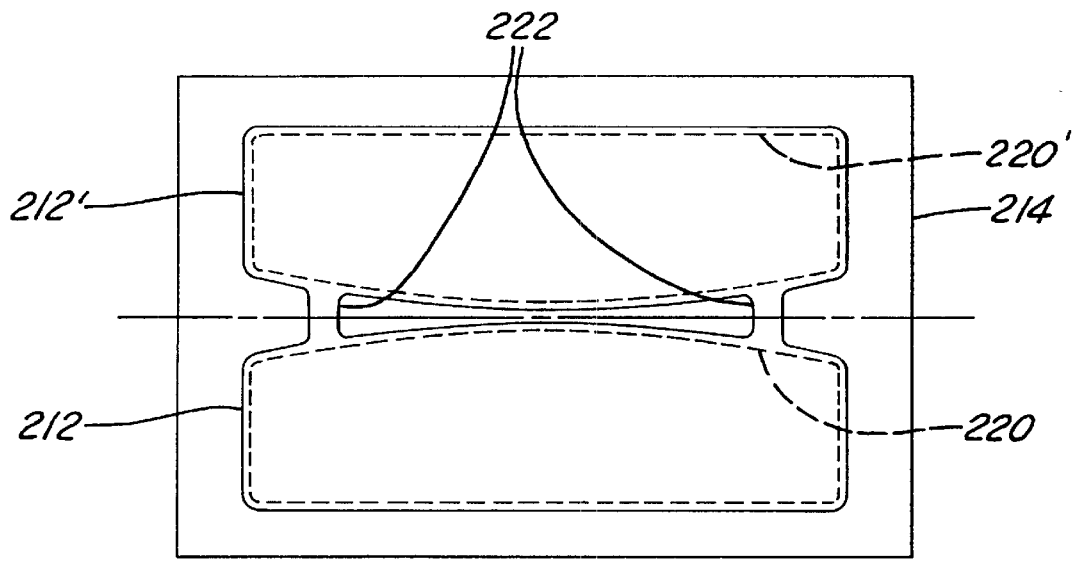
FIG. 13 is a plan view of a third embodiment of a one-way anti-backflow valve in a closed condition.
Figure 14:
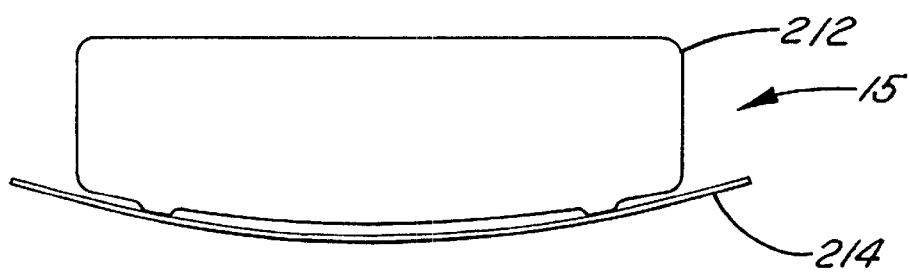
FIG. 14 is an elevational view of the valve of FIG. 13 in a high-pressure exhaust mode.
Figure 15:
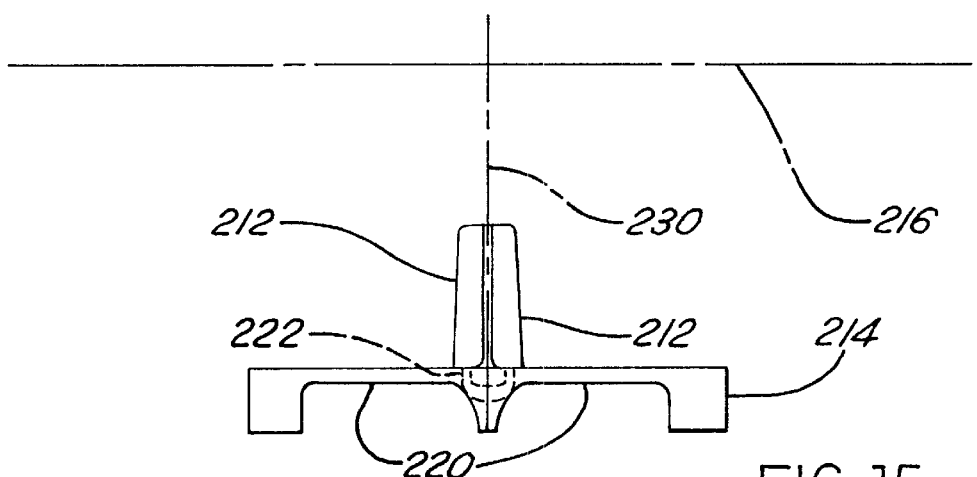
FIG. 15 is a side elevational view of the valve of FIG. 14 in the direction of arrow 15.

In the valve 210 embodiment shown in FIGS. 13–15, there are a pair of "twinned" vanes 212 and 212' joined to a plate 214 by common tabs 222. The closed position or mode is shown only in FIG. 13. Vent openings 220 and 220' and vanes 212 and 212' are mirror images of each other on either side of an imaginary plane 230 separating the two sides and approximating a hinge axis. Imaginary plane 230 is normal to axis of curvature 216. Tabs 222 bias vanes 212 against plate 214. The low pressure mode of deflection of each of vanes 212 is similar to that illustrated in FIGS. 3 and 4. The high pressure mode of deflection of vanes 212 is illustrated in FIGS. 14 and 15. As with vane 12, vanes 212 have reverse curvature in the high pressure mode. Vanes 212 are able to contact each other in the high pressure mode, with contact occurring at the apex of the arched vanes 212. The contact between vanes 212 and 212' enable vanes 212 and 212' to stabilize each other in the high pressure mode. The contact eliminates valve flutter which might otherwise occur.

It is anticipated that for some applications it will be desirable to form plate 14, 114, 214 as part of a housing which would in turn be mounted to the chamber which is to be unidirectionally vented. Such housings could be designed for mounting on either an outside surface or an inside surface. The housings would preferably be provided with a means of sealing to the surface to which they are mounted. Failure to provide an adequate housing seal would result in undesired backflow into the chamber in spite of the seal provided by the vane against the plate.

The dual low pressure/high pressure exhaust mode characteristic of the valves described allows low pressure/low flow rate exhaust as may required, while also accommodating a high pressure/high flow rate event such as exhausting the cabin to account for air being pumped into the passenger cabin by the heating, ventilating and air conditioning system of the vehicle, without sacrificing the sealing capabilities of the valve. Additionally, because the vane seals by bowing against the plate, and because of the light weight of the vane, the valve can be located without regard to the orientation of the valve. This is contrasted with valves which rely on gravity for closure, or for spring loaded valves with relative heavy vanes, the sealing capabilities of which may be adversely affected by gravity.

In tests, the backflow of air past the seal of the vane against the plate was well within the test objectives. The forward flow exceeded the test objectives at pressures equal to 0.1 and 0.5 inches of water pressure. The results were the same, independent of the orientation of the valve. Testing was performed in a wind tunnel testing fixture designed for testing automotive cabin exhauster valves.

Many alternative constructions of the valve are readily apparent. Alternative configurations may employ composite vane assemblies. For example, metal vanes may be used in combination with polymer tabs or hinges. In one version of the inventive valve, a vane could be attached on opposite sides at or near the center of its associate plate so that the ends of the vane would deflect in the same mode as shown in FIG. 10. With the vane attached on two sides, it would be unable to pivot up to the high pressure mode shown in FIGS. 11 and 12. Similarly, a vane could be attached to a plate on just one end instead of at it center. However, both versions would still provide the desired sealing against back pressure, and would exhaust at relatively low pressures. Such valves may suffer from restricted high pressure flow capacity, and susceptibility to flutter of the free ends of the vane. Also, the vane need not necessarily be flat in its free condition. It could alternatively have a pre-set curvature radius greater than that of the plate, and be oriented with its concave side either facing or opposite the concave plate to achieve either higher or lower sealing loads respectively than a flat vane.

If the vane has it concave side oriented toward the concave plate, the free curvature radius of the vane may be even smaller than the plate's radius of curvature. Versions of the valve employing a flat or a convex plate are also anticipated. While the embodiments discussed to this point all employ a concave plate, it should be appreciated that it is the difference in curvature between the plate and the vane which results in the sealing force of the vane being applied against the plate. For example, a convex plate having a radius of 9 inches (230 mm) could be used in combination with a vane formed to have a permanent radius in a free or unloaded condition of 6 inches (150 mm). Fixing the curved vane to the concave plate results in the vane exerting a load against the pressure plate just like the loads exerted by vanes 12, 112 and 212 against plates 14, 114, and 214. Similarly, if the plate is flat, a curved vane could be used to achieve the desired sealing load, as long as the concave side of the vane is pressed against the plate. It is understood that the amount of curvature of the vane will vary with other parameters of the vane, such as the stiffness of the vane and the size and shape of the vane. What is common to each of the possible combinations of plate curvature and the free curvature of the vane is that the vane has a curvature distinct from the plate, and when the vane is pressed into conformance with the plate at the opening, the vane is forced to bend and thereby generate a sealing load around the opening in the plate.

The word curvature as used herein refers to surfaces that are flat as well as curved. The curvature of the plates and vanes may be thought of as being positive or negative to indicate whether it is a convex or concave surface and may have a magnitude indicator as well corresponding to a radius. A flat surface would be characterized as a curvature having an radius equal to infinity. Therefore the term curvature is not exclusive of flat surfaces. Again, as noted above in the discussion of FIGS. 1–6, the curvature is not limited to constant radius curves.

The basic valve structure is suitable for many different types of valves. The vane material must be chosen to suit the application, the fluid to be controlled, temperature, pressure, environmental and flow requirements. It can function as a check valve in gas or liquid pumps, venting devices or systems, anti-backflow valve for breathing devices, medical infusion systems, plumbing systems, clothes dryers, sanitary vents, range hood vents, building vents. The list is nearly endless.

The embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

We claim:

1. A one-way valve comprising:

a plate having a vent opening of a first size and shape and the plate having a first curvature;

a flexible vane having a second curvature distinct from the first curvature, the vane being fixed to the plate in a manner facilitating the movement of the vane between an open position and a closed position, and the vane being in a bent condition in the closed position, and the vane conforming to the first curvature of the plate over the vent opening and covering the vent opening in the closed position, and the vane being elastic throughout a range of deflection of the vane associated with the vane moving between the closed position and the open position;

at least one of the first curvature and the second curvature having an axis of curvature about which the one curvature is formed; and a hinge disposed on a side of the vane fixing the vane to the plate and enabling pivoting between the open position and the closed position about a hinge axis normal to the axis of curvature;

wherein the vane and the plate and the hinge are configured so that the hinge resists deflection and the vane bows relative to the axis of curvature responsive to a first pressure level and so that the hinge deflects and the vane correspondingly pivots about the hinge axis responsive to a second pressure level greater than the first pressure level.

2. A one-way valve as claimed in claim 1 wherein the hinge is defined by two tabs extending from the side of the vane proximate to opposite ends of the vane, and responsive to the first pressure level the tabs resist bending and a portion of the vane disposed between the hinges bows away from the plate, and responsive to the second pressure level the tabs bend and the vane pivots to the open position.

3. A one-way valve as claimed in claim 1 wherein the hinge is defined by a tab extending from the side of the vane proximate to a mid-point of the vane, and responsive to the first pressure level ends of the vane distal to the tab bows away from the plate, and responsive to the second pressure level the tab bends and the vane pivots to the open position.

4. A one-way valve comprising:

a plate having a vent opening of a first size and shape and the plate having a first curvature;

a flexible vane having a second curvature distinct from the first curvature, the vane being fixed to the plate by two tabs extending from a side of the vane, and the tabs being disposed at least as close to the ends of the vane as to each other, and the vane being in a bent condition in a closed position, and the vane covering the vent opening in the closed position, and the vane conforming to the first curvature of the plate over the vent opening and covering the vent opening in the closed position, and the vane being elastic throughout a range of deflection between the closed position and an open position; and the tabs being formed integral and unitary with the vane wherein the tabs are a living hinge about which the vane pivots between the open position and the closed position and the tabs are sufficiently stiff to resist deflection at a first pressure level.

5. A one-way valve as claimed in claim 4 wherein the first curvature is substantially parallel to an axis of curvature and a line through the tabs is approximately normal to the axis of curvature.

6. A one-way valve as claimed in claim 5 wherein the vane has a first dimension in a first direction normal to the axis of curvature and has a second dimension in a second direction parallel to the axis of curvature wherein the first dimension is smaller than the second dimension.

7. A one-way valve as claimed in claim 5 wherein the vent opening is a first vent opening and the plate has a second vent opening with each of the vent openings being a mirror image of the other across an imaginary plane extending between the two vent openings and the flexible vane is a first flexible vane and the tabs are first tabs and the valve has a second flexible vane in the mirror image of the first flexible vane disposed over the second opening the second flexible vane has second tabs integral and unitary with the first tabs and the second vane, and the first tabs and the second tabs connected to a portion of the plate intermediate both of the vent openings.

8. A one-way valve as claimed in claim 7 wherein the vanes have a first dimension in a first direction normal to the axis of curvature and have a second dimension in a second direction parallel to the axis of curvature wherein the first dimension is smaller than the second dimension.

9. A one-way valve as claimed in claim 7 wherein the side of each vane from which the tabs extend is curved to be substantially complementary to the curvature of the plate, thereby substantially preventing deflection of the vane and relying on the deflection of the hinges.

10. A one-way valve as claimed in claim 5 wherein the vane is formed of a material having a coefficient of thermal expansion substantially equal to the coefficient of thermal expansion of the plate.

11. A one-way valve as claimed in claim 5 wherein the vane is substantially the same shape and size as the opening in the plate.

12. A one-way valve as claimed in claim 6 wherein the side of the vane to which the tabs extend is curved to be substantially complementary to the curvature of the plate, thereby substantially preventing deflection of the vane and relying on deflection of the hinges.

13. A one-way valve as claimed in claim 5 wherein a first of the tabs is fixed to the plate and a second of the tabs is slidably held against the plate by a restraining feature which permits the second tab to remain in engagement with the plate with relative thermal contraction and expansion of the vanes relative to the plate.

14. A one-way valve comprising:
a concave plate having a vent opening of a first size and substantially rectangular shape;
a flexible vane having a substantially rectangular shape and the vane having a substantially flat shape in a free state, the vane covering the vent opening, and the vane being sufficiently flexible that it conforms to a curvature of the plate in a closed position and the vane being elastic throughout a range of deflection between the closed position and the open position and the vane being sufficiently stiff to develop a desired sealing load when forced to conform to the concave plate; and
a hinge in the form of a tab extending from a longer side of the vane and fixed to the plate and the tab formed integral and unitary with the vane with the tab operating as a living hinge enabling pivoting of the hinge between an open position and a closed position, and the tab being smaller than the length of the side of the vane to which the tab is attached,
wherein the tab and the vane have associated bending stiffnesses such that the tab resists deflection and a portion of the vane distal to the tab deflects away from the plate and a portion of the vane proximate to the tab remains proximate to the plate responsive to a first pressure level and further wherein the tab deflects and the vane pivots about the hinge axis to the open position responsive to a second pressure level.

15. A one-way valve as claimed in claim 14 wherein the tab being located proximate to a midpoint of the side.

16. A one-way valve as claimed in claim 15 wherein the side of the vane from which the tab extends is curved to be substantially complementary to the curvature of the plate, thereby substantially preventing engagement of the ends of the side of the vane in the open position.

17. A one-way valve as claimed in claim 14 wherein the side of the vane from which the tab extends is curved to be substantially complementary to the curvature of the plate, thereby substantially preventing engagement of the ends of the side of the vane in the open position.

18. A one-way valve as claimed in claim 14 wherein the vent opening is a first vent opening and the plate has a second vent opening with each of the vent openings being a mirror image of the other across an imaginary plane extending between the two vent openings and the flexible vane is a first flexible vane and the tabs are first tabs and the valve has a second flexible vane in the mirror image of the first flexible vane disposed over the second opening the second flexible vane has second tabs integral and unitary with the first tabs and the second vane, and the first tabs and the second tabs connected to a portion of the plate intermediate both of the vent openings.

19. A one-way valve as claimed in claim 14 wherein the vane is formed of a material having a coefficient of thermal expansion substantially equal to the coefficient of thermal expansion of the plate.

20. A one-way valve as claimed in claim 14 wherein the vane is substantially the same shape and size as the opening in the plate.

21. A one-way valve comprising:
a plate having a vent opening of a first size and shape and the plate having a first curvature;
a flexible vane having a second curvature distinct from the first curvature, the vane being fixed to the plate in a manner facilitating the movement of the vane between an open position and a closed position, and the vane being in a bent condition in the closed position, and the vane conforming to the first curvature of the plate over the vent opening and covering the vent opening in the closed position, and the vane being elastic throughout a range of deflection of the vane associated with the vane moving between the closed position and the open position;
at least one of the first curvature and the second curvature having an axis of curvature about which the one curvature is formed; and
a hinge disposed on a side of the vane fixing the vane to the plate and enabling pivoting between the open position and the closed position about a hinge axis normal to the axis of curvature,
wherein two tabs extend from the side of the vane and one of the tabs is fixed to the plate and a second of the tabs is displaceable relative to the plate permitting the second tab to remain in engagement with the plate with relative thermal contraction and expansion of the vane relative to the plate.

22. A one-way valve comprising:
a plate having a vent opening of a first size and shape and the plate having a substantially concave curvature arcing about an axis of curvature;
a flexible vane,
the vane being substantially flat in an unstrained condition,
the vane being of a shape substantially the same as the shape of the opening in the plate,
the vane being sized and positioned relative to the opening to slightly overlap the opening,
the vane having a tab defining a living hinge extending from a side of the vane and the tab being connected to a corresponding side of the plate and the tab being fixed to the plate in a manner facilitating pivoting of the vane between an open position and a closed position about a hinge axis normal to the axis of curvature, the vane being in a bent condition in conformance with the plate over the vent opening in the closed position, the vane having a first stiffness relative to the axis of curvature permitting deflection of a portion of the vane distal to the tab away from the plate responsive to a first level of pressure, the tab having a second stiffness resisting pivoting of the vane to the open position and the tab deflecting responsive to a second level of pressure enabling the vane to pivot away from the plate responsive to a second level of pressure, the second level of pressure being greater than the first level of pressure, the vane and the tab both being elastic throughout a range of deflection of the vane associated with the vane moving between the closed position and the open position.

* * * * *